US010826071B2

(12) United States Patent
He et al.

(10) Patent No.: US 10,826,071 B2
(45) Date of Patent: *Nov. 3, 2020

(54) COATING LIQUID FOR CATHODE ACTIVE MATERIAL, METHOD FOR MAKING THE SAME, AND METHOD FOR COATING CATHODE ACTIVE MATERIAL

(71) Applicant: Tsinghua University, Beijing (CN)

(72) Inventors: Xiang-Ming He, Beijing (CN); Ying-Qiang Wu, Suzhou (CN); Li Wang, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 42 days.

This patent is subject to a terminal disclaimer.

(21) Appl. No.: 16/010,407

(22) Filed: Jun. 16, 2018

(65) Prior Publication Data

US 2018/0309131 A1 Oct. 25, 2018

Related U.S. Application Data

(63) Continuation of application No. PCT/CN2016/107276, filed on Nov. 25, 2016.

(30) Foreign Application Priority Data

Dec. 17, 2015 (CN) .......................... 2015 1 0952242

(51) Int. Cl.
*H01B 1/00* (2006.01)
*H01M 4/62* (2006.01)
(Continued)

(52) U.S. Cl.
CPC ............. *H01M 4/628* (2013.01); *C01B 25/36* (2013.01); *C01G 53/50* (2013.01); *C09D 1/00* (2013.01);
(Continued)

(58) Field of Classification Search
CPC ..... C01B 25/36; C01G 53/50; C01P 2004/80; C01P 2006/40; C09D 1/00;
(Continued)

(56) References Cited

U.S. PATENT DOCUMENTS 3,870,737 A * 3/1975 Birchall .................. C01B 25/36 556/174
4,015,050 A * 3/1977 Birchall ............... A01G 9/1438 428/480

(Continued)

FOREIGN PATENT DOCUMENTS

| CN | 102347473 A | 2/2012 |
| CN | 102569789 A | 7/2012 |
| CN | 105742605 A * | 7/2016 |

OTHER PUBLICATIONS

International Search Report of PCT/CN2016/107276.
(Continued)

*Primary Examiner* — Mark Kopec
*Assistant Examiner* — Jaison P Thomas

(57) ABSTRACT

The present disclosure relates to a method for making a cathode active material coating liquid including steps of forming a phosphate ester solution by adding a phosphate ester in an alcoholic solvent, introducing an aluminum salt to the phosphate ester solution, the aluminum salt being soluble to the alcoholic solvent, and the aluminum salt reacting with the phosphate ester to form a homogeneous clear solution, and adding an acidity regulator to adjust a pH value of the homogenous clear solution to 6 to 7. The present disclosure also relates to a cathode active material coating liquid and a method for coating the cathode active material.

13 Claims, 8 Drawing Sheets

(51) Int. Cl.
| | |
|---|---|
| H01M 4/131 | (2010.01) |
| C01B 25/36 | (2006.01) |
| C01G 53/00 | (2006.01) |
| C09D 1/00 | (2006.01) |
| H01M 4/36 | (2006.01) |
| H01M 4/505 | (2010.01) |
| H01M 4/525 | (2010.01) |
| H01M 4/02 | (2006.01) |

(52) U.S. Cl.
CPC .............. H01B 1/00 (2013.01); H01M 4/131 (2013.01); H01M 4/366 (2013.01); *C01P 2004/80* (2013.01); *C01P 2006/40* (2013.01); *H01M 4/505* (2013.01); *H01M 4/525* (2013.01); *H01M 2004/028* (2013.01)

(58) Field of Classification Search
CPC ........... H01M 2004/028; H01M 4/131; H01M 4/366; H01M 4/505; H01M 4/525; H01M 4/628
See application file for complete search history.

(56) References Cited

U.S. PATENT DOCUMENTS

| | | | | |
|---|---|---|---|---|
| 4,080,311 | A * | 3/1978 | Kehl | B01J 27/16 |
| | | | | 502/208 |
| 4,454,193 | A * | 6/1984 | Block | C04B 41/009 |
| | | | | 427/113 |
| 4,542,001 | A * | 9/1985 | Iino | C01B 25/36 |
| | | | | 423/308 |
| 6,022,513 | A * | 2/2000 | Pecoraro | B01J 27/16 |
| | | | | 423/311 |
| 7,326,498 | B2 | 2/2008 | Park et al. | |
| 7,678,465 | B2 * | 3/2010 | Sambasivan | C23C 22/74 |
| | | | | 428/469 |
| 2003/0138673 | A1* | 7/2003 | Sambasivan | C09D 7/61 |
| | | | | 428/702 |
| 2004/0138058 | A1* | 7/2004 | Sambasivan | C23C 22/74 |
| | | | | 502/208 |
| 2007/0190765 | A1* | 8/2007 | Xie | A61L 2/084 |
| | | | | 438/585 |
| 2012/0027929 | A1 | 2/2012 | Huang et al. | |
| 2012/0171570 | A1 | 7/2012 | Huang et al. | |
| 2013/0065066 | A1* | 3/2013 | Sambasivan | C03C 1/008 |
| | | | | 428/432 |
| 2018/0309132 | A1* | 10/2018 | He | C01B 25/36 |
| 2018/0316016 | A1* | 11/2018 | He | H01M 4/628 |
| 2018/0337401 | A1* | 11/2018 | Ni | H01M 4/366 |

OTHER PUBLICATIONS

Correlation between AlPO4 nanoparticle coating thickness on LiCoO2 cathode and thermal stablility, J.Cho, Electrochimica Acta 48(2003) 2807-2811.

* cited by examiner

The acidity (pH value) of the coating liquid is not adjusted

The acidity (pH value) of the coating liquid is adjusted

COATING LIQUID FOR CATHODE ACTIVE MATERIAL, METHOD FOR MAKING THE SAME, AND METHOD FOR COATING CATHODE ACTIVE MATERIAL

CROSS-REFERENCE TO RELATED APPLICATIONS

This application claims all benefits accruing under 35 U.S.C. § 119 from China Patent Application No. 201510952242.5, filed on Dec. 17, 2015 in the State Intellectual Property Office of China, the entire content of which is hereby incorporated by reference. This application is a continuation under 35 U.S.C. § 120 of international patent application PCT/CN2016/107276 filed on Nov. 25, 2016, the content of which is also hereby incorporated by reference. This application is related to a commonly-assigned patent entitled, "COATING LIQUID FOR CATHODE ACTIVE MATERIAL, METHOD FOR MAKING THE SAME, AND METHOD FOR COATING CATHODE ACTIVE MATERIAL" (U.S. patent application Ser. No. 16/010,409) filed concurrently herewith.

FIELD

The present disclosure relates to cathode active material coating liquids, methods for making the same, and methods for coating the cathode active materials.

BACKGROUND

Coating a layer of a material on a surface of cathode active material particles is a common method to modify the cathode active material of a lithium ion battery. For example, coating a carbon layer on the surface of lithium iron phosphate particles can effectively solve the low electrical conductivity problem of the lithium iron phosphate to achieve better electrical conductivity. In another example, coating a surface of lithium cobalt oxide particles or other cathode active material particles with aluminum phosphate can improve a thermal stability of the cathode of the lithium ion battery (referring to "Correlation between $AlPO_4$ nanoparticle coating thickness on $LiCoO_2$ cathode and thermal stablility." J. Cho, Electrochimica Acta 48 (2003) 2807-2811 and U.S. Pat. No. 7,326,498).

In a conventional method for coating the aluminum phosphate on the cathode active material, aluminum phosphate particles are dispersed in water to form a dispersion liquid, the cathode active material particles are added in the dispersion liquid, the aluminum phosphate particles are adsorbed on the surface of the cathode active material particles due to adsorption effect, the water in the dispersion liquid is dried, and the resultant solid is heated at 700° C. to form the cathode active material having the aluminum phosphate particles on the surface thereof. However, because the aluminum phosphate is insoluble in water, the aluminum phosphate coating layer formed on the surface of the cathode active material by the above method is not uniform, resulting in a relatively poor cycling performance of the lithium ion battery.

SUMMARY

What is needed therefore is to provide a cathode active material coating liquid, a method for making the same, and a method for coating the cathode active material.

An aspect of the present disclosure includes a method for making a cathode active material coating liquid with the following steps:

S1, forming a phosphate ester solution by adding a phosphate ester in an alcoholic solvent;

S2, introducing an aluminum salt to the phosphate ester solution, the aluminum salt being soluble to the alcoholic solvent, and the aluminum salt reacting with the phosphate ester to form a homogeneous clear solution; and S3, adding an acidity regulator to adjust a pH value of the homogenous clear solution to a range of 6 to 7.

Another aspect of the present disclosure includes a method for coating the cathode active material with the following steps:

S1, forming a phosphate ester solution by adding a phosphate ester in an alcoholic solvent;

S2, introducing an aluminum salt to the phosphate ester solution, the aluminum salt being soluble to the alcoholic solvent, and the aluminum salt reacting with the phosphate ester to form a homogeneous clear solution; and S3, adding an acidity regulator to adjust a pH value of the homogenous clear solution to a range of 6 to 7 to achieve a coating liquid;

S4, uniformly mixing the cathode active material with the coating liquid to obtain a solid-liquid mixture; and S5, drying and sintering the solid-liquid mixture to obtain a cathode composite material, the cathode composite material including the cathode active material and a coating layer coated on a surface of the cathode active material.

Since the cathode active material coating liquid of the present disclosure is a homogeneous clear solution, a thin, uniform, and continuous coating layer can be easily formed on the surface of the cathode active material particles, and the surface of each cathode active material particle can be completely covered by the coating layer. The coating layer can prevent side reactions between the cathode active material and electrolyte solution, thereby improving thermal stability and capacity retention of the lithium ion battery. Moreover, since the thickness of the coating layer is small, the electrochemical performance of the lithium ion battery is not reduced. In addition, by adding the acidity regulator to adjust the coating liquid from acidic to near neutral, a negative effect of the acidic solution on the cathode active material can be effectively reduced.

BRIEF DESCRIPTION OF THE DRAWINGS

Implementations are described by way of example only with reference to the attached figure.

DETAILED DESCRIPTION

A detailed description with the above drawings further illustrate the present cathode active material coating liquid, the method for making the same, and the method for coating the cathode active material.

One embodiment of the cathode active material coating liquid includes a solvent and a coating precursor soluble to the solvent. The cathode active material coating liquid is a homogeneous clear solution, and the coating precursor is completely dissolved in the solvent. The solvent at least includes an alcoholic solvent, and may further include other solvents (e.g. organic solvent) that are miscible with the alcoholic solvent. The cathode active material coating liquid has a pH value of 6 to 7.

In some embodiments, the solvent in the cathode active material coating liquid can consist of an organic solvent, and in one embodiment can consist of the alcoholic solvent. In some other embodiments, the solvent in the cathode active material coating liquid can be a combination of the organic solvent and water, and in one embodiment a combination of the alcoholic solvent and water. In one embodiment, the water in the solvent is only crystal water introduced from a raw material for synthesizing the coating precursor.

The coating precursor can comprise a complex represented by at least one of formulae (1-1) and (1-2):

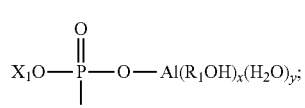

(1-1)

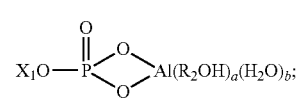

(1-2)

wherein the $R_1OH$ and $R_2OH$ are alcoholic solvent molecules and can be selected from one or more of methanol, ethanol, propanol, n-butanol and isopropanol; x can be 1 to 5, y can be 0 to 4, and x+y=5; a can be 1 to 4, b can be 0 to 3, and a+b=4, that is each aluminum atom is coordinated with at least one alcohol solvent molecule and can be coordinated with at least one water molecule; —$OX_1$ and —$OX_2$ can be an —OH group or a carbon-oxygen group corresponding to the alcoholic solvent molecule, for example, —$OX_1$ and —$OX_2$ can be selected from at least one of —OH, methoxy, ethoxy, propoxy, butoxy, and isopropoxy.

A mass percentage of the coating precursor in the cathode active material coating liquid can be in a range from about 1% to about 15%.

Figure 1:
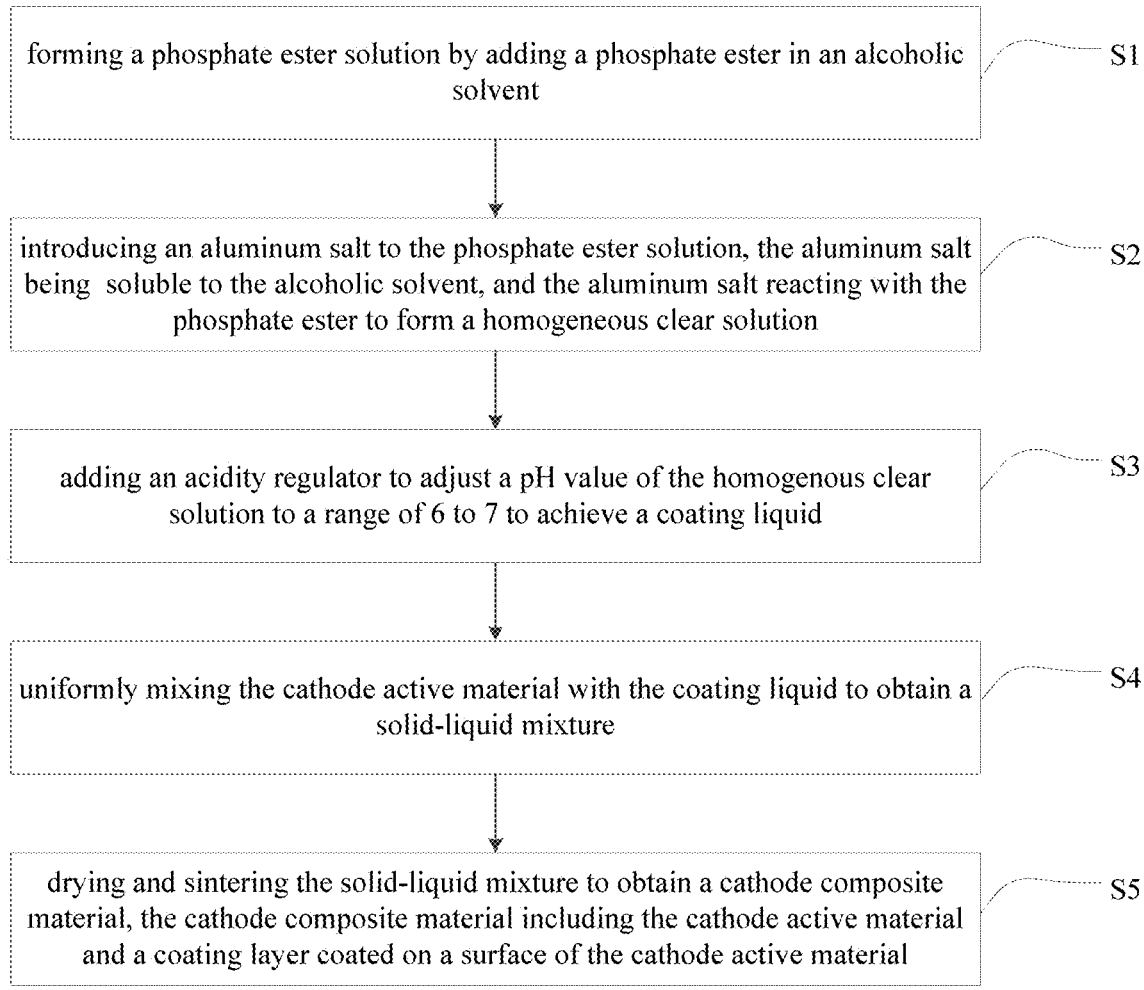
FIG. 1 is a flow chart of one embodiment of a method for making a cathode active material coating liquid and one embodiment of a method for coating the cathode active material.

Referring to FIG. 1, an embodiment of the method for making the cathode active material coating liquid includes the following steps:

S1, forming a phosphate ester solution by adding a phosphate ester in an alcoholic solvent;

S2, introducing an aluminum salt to the phosphate ester solution, the aluminum salt being soluble to the alcoholic solvent, and the aluminum salt reacting with the phosphate ester to form a homogeneous clear solution; and S3, adding an acidity regulator to adjust a pH value of the homogenous clear solution to 6 to 7.

The alcoholic solvent can be methanol, ethanol, propanol, n-butanol, isopropanol, or a mixed solvent including two or more thereof.

The phosphate ester can have a general formula $A_nP(O)(OH)_m$, wherein A is a carbon-oxygen group corresponding to the alcoholic solvent molecule, such as at least one of methoxy, ethoxy, propoxy, butoxy, and isopropoxy, n is 1 to 3, m is 0 to 2, m+n=3. Specific examples of the phosphate ester can be at least one of monomethyl phosphate, dimethyl phosphate, trimethyl phosphate, monoethyl phosphate, diethyl phosphate, triethyl phosphate, monobutyl phosphate, dibutyl phosphate, tributyl phosphate, monoisopropyl phosphate, diisopropyl phosphate, and triisopropyl phosphate.

A mass ratio of the phosphate ester to the alcoholic solvent can be in a range from about 1:1 to about 1:50.

The step S1 can further include forming the phosphate ester by adding at least one of phosphoric acid and phosphorus pentoxide ($P_2O_5$) in the alcoholic solvent to react with the alcoholic solvent at a temperature of about 0° C. to about 80° C. The amount of the alcoholic solvent is excessive so that the phosphoric acid and/or the phosphorus pentoxide can be completely reacted. In one embodiment, a mass ratio of the phosphoric acid and/or the phosphorus pentoxide to the alcoholic solvent is in a range from about 1:1 to about 1:50.

In the present embodiment, phosphorus pentoxide is reacted with ethanol to have reactions shown in equations (2-1) and (2-2).

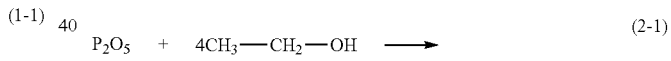

(2-1)

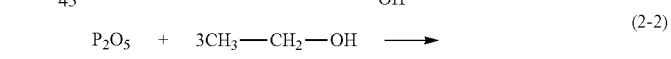

(2-2)

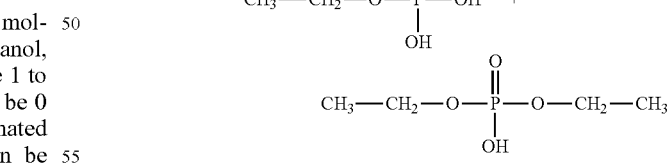

The aluminum salt can be an alcohol-soluble aluminum salt and can dissociate aluminum ions in the alcoholic solvent. In one embodiment, the aluminum salt is one or more of aluminum chloride, aluminum nitrate, aluminum isopropoxide, and aluminum lactate. A mass ratio of the total amount of the alcohol-soluble aluminum salt to the alcoholic solvent can be in a range from about 1:1 to about 1:50. A molar ratio of the phosphorus element contained in the phosphate ester to the aluminum element contained in the alcohol-soluble aluminum salt (P:Al) can be about 1:1. The aluminum salt may or may not have crystal water.

In step S2, the aluminum salt reacts with the phosphate ester in the alcoholic solvent, so that, on one hand, the aluminum ion reacts with the hydroxyl group of the phosphate ester to form a P—O—Al structure, and on the other hand, the aluminum ion coordinates with the alcoholic solvent molecule to have an ionic solvation and form a complex. A reaction temperature in step S2 can be in a range from about 20° C. to about 80° C., and a reaction time can be in a range from about 30 minutes to about 10 hours. When m in the general formula of the phosphate ester equals to 0 (m=0), the crystal water introduced by the aluminum salt can also hydrolyze the phosphate ester to obtain a hydroxyl group, so as to have the above reaction proceed.

In one embodiment, the step S2 can comprise:

S21, adding the aluminum salt to another alcoholic solvent and stirring till the aluminum salt is dissolved to obtain an aluminum salt solution; and S22, further mixing the phosphate ester solution obtained in step S1 and the aluminum salt solution obtained in step S21 to react the aluminum salt with the phosphate ester to form the homogeneous clear solution.

In one embodiment, the phosphate ester solution reacts with the aluminum salt solution to have reactions shown in equations (2-3) and (2-4).

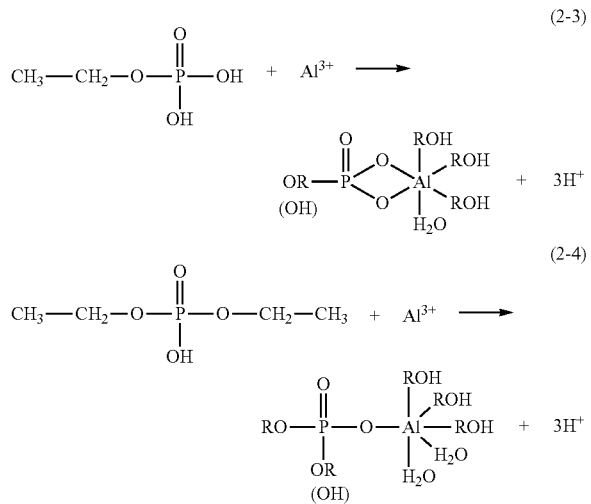

Since water has negative effects on the performance of certain cathode active materials, such as high nickel content ternary cathode active materials and a lithium cobalt oxide, some embodiments of the cathode active material coating liquid does not contain water, or only contains crystal water introduced from the raw material, such as the aluminum salt. In one embodiment of the method for making the cathode active material coating liquid, none of the aluminum salt solution, the phosphate ester solution, and the finally obtained homogeneous clear solution contains water, and the solvent is only an organic solvent. In another embodiment, the solvent only contains crystal water introduced from the aluminum salt. In addition, the non-aqueous coating liquid has a smaller viscosity and a smaller surface tension, so that the coating layer on the surface of the cathode active material can be more uniform.

In step S3, the acidity regulator can be one or more of ammonia water, ammonium bicarbonate, ammonium carbonate, ammonium acetate, pyridine, and triethylamine. A total amount of the acidity regulator that is added can be in accordance with the amount of the aluminum salt to have a molar ratio of the nitrogen element contained in the acidity regulator to the aluminum element contained in the aluminum salt (N:Al) being in a range from about 1:1 to about 6:1.

In one embodiment, step S3 can comprise: weighing the acidity regulator in a stoichiometric ratio; adding the acidity regulator into the homogeneous clear solution portion by portion; and stirring the homogeneous clear solution during the adding of the acidity regulator to uniformly disperse the acidity regulator in the homogeneous clear solution till the addition of the acidity regulator is completed. The coating precursor easily decomposes to form precipitate in alkaline environment which makes the coating liquid unstable and not clear. In order to prevent the homogeneous clear solution from being alkaline, the amount of the acidity regulator should not be excessive. Adding the acidity regulator into the homogeneous clear solution portion by portion and stirring the homogeneous clear solution during the adding of the acidity regulator can avoid local excess of the acidity regulator.

Figure 2A:
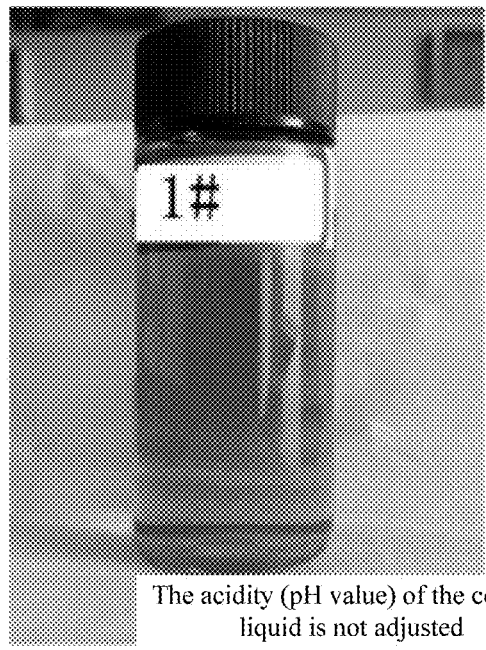
FIG. 2A is a photo of one embodiment of the coating liquid having an acidity regulator and FIG. 2B is a photo of a coating liquid without the acidity regulator, both of the coating liquids having the cathode active material immersed therein for a period of time.
Figure 2B:
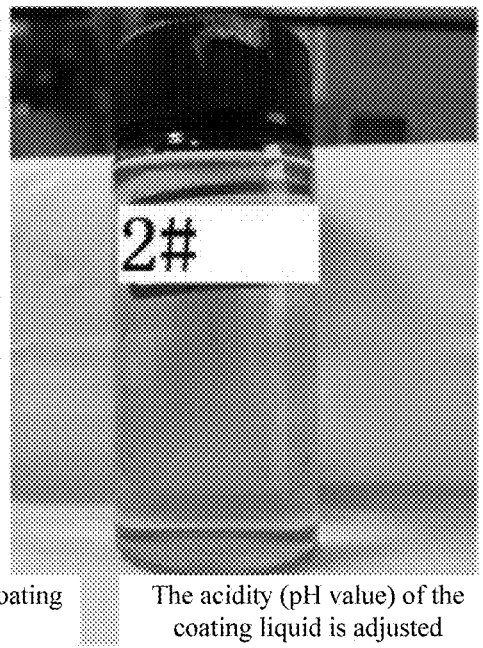

Too strong an acidity of the coating liquid may lead to dissolution of active components in some cathode active materials, thereby deteriorating the performance and destroying the structure stability of the cathode active material. Referring to FIG. 2A, in which 1# is a coating liquid without the acidity regulator, and FIG. 2B, in which 2# is a coating liquid being adjusted to neutral by having the acidity regulator, the coating liquids can be compared by both having the cathode active material immersed therein for a period of time. The 1# coating liquid has a deep pale red color, indicating that there are more active metal ions dissolved from the cathode active material, while the 2# coating liquid is colorless, indicating that there are less active metal ions dissolved from the cathode active material. The coating liquid in step S3 is still a clear solution when the acidity thereof is adjusted to about neutrality, and no precipitation occurs.

One embodiment of the method for coating the cathode active material applies the cathode active material coating liquid to coat the cathode active material, which includes the following steps:

S4, uniformly mixing the cathode active material with the cathode active material coating liquid to obtain a solid-liquid mixture; and S5, drying and sintering the solid-liquid mixture to obtain a cathode composite material, the cathode composite material including the cathode active material and a coating layer coated on a surface of the cathode active material.

Figure 3:
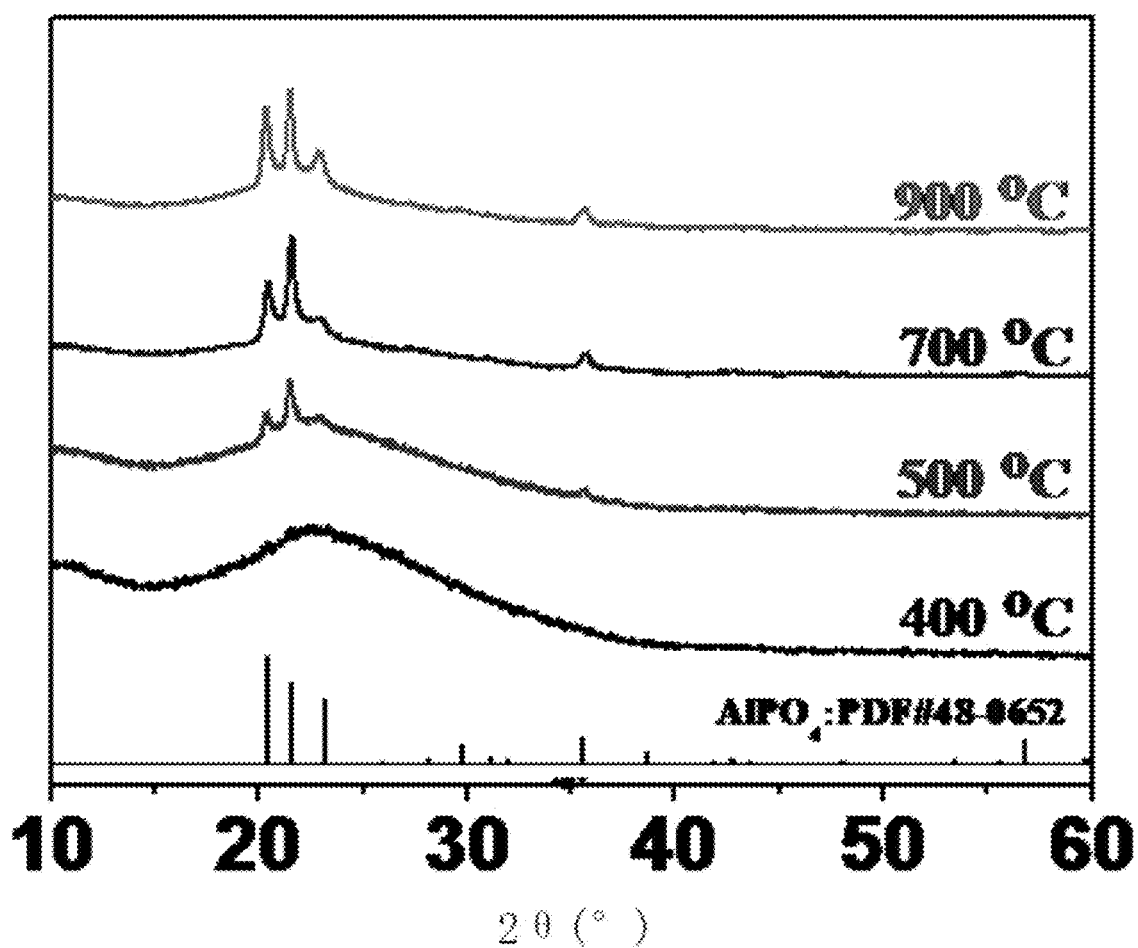
FIG. 3 shows X-ray diffraction ("XRD") patterns of embodiments of coating layers obtained at different sintering temperatures.

Referring to FIG. 3, using XRD analysis, the products of the cathode active material coating liquid dried and sintered at different temperatures (e.g., 400° C., 500° C., 700° C., and 900° C.), reveals the chemical composition of the coating layer is $AlPO_4$.

A mass percentage of the coating layer in the cathode composite material can be about 0.3% to about 5%, and a thickness of the coating layer can be about 5 nm to about 100 nm.

The cathode active material can be at least one of lithium transition metal oxide having a layered-structure, lithium transition metal oxide having a spinel structure, and lithium transition metal oxide having an olivine structure, for example, olivine type lithium iron phosphate, layered type lithium cobalt oxide, layered type lithium manganese oxide, spinel type lithium manganese oxide, lithium nickel manganese oxide, and lithium nickel cobalt manganese oxide.

In step S4, a thin layer of the coating liquid can be formed on the surface of the cathode active material. In one embodiment, the cathode active material and the cathode active material coating liquid are uniformly mixed and then filtered to form the solid-liquid mixture in a slurry state, such that the cathode active material coating liquid is only coated on the surface of the cathode active material, which is beneficial for obtaining the cathode composite material with a relatively thin coating layer.

In step S5, the solid-liquid mixture can be naturally dried at room temperature or heated, such as at about 60° C. to about 100° C., as long as the solvent in the mixture can be removed. The sintering can be performed in air to remove the organic groups from the coating precursor to form the coating layer. The sintering temperature can be about 300° C. to about 800° C., and in one embodiment is about 400° C. The sintering time can be about 3 hours to about 8 hours.

Since the cathode active material coating liquid in the embodiment of the present disclosure is a homogeneous clear solution, a thin, uniform, and continuous coating layer can be easily formed on the surface of the cathode active material particles, and the surface of each cathode active material particle can be completely covered by the coating layer. The coating layer can prevent side reactions between the cathode active material and electrolyte solution, thereby improving thermal stability and capacity retention of the lithium ion battery. On the other hand, since the thickness of the coating layer is small, the electrochemical performance of the lithium ion battery is not reduced. In addition, by adding the acidity regulator to adjust the coating liquid from acidic to near neutral, a negative effect of the acidic solution on the cathode active material can be effectively reduced.

Example 1

Phosphorus pentoxide and ethanol in a molar ratio of 1:10 are mixed, and stirred at room temperature to have the diphosphorus pentoxide completely reacted and the phosphate ester solution synthesized. Aluminum nitrate and ethanol in a molar ratio of 1:10 are mixed to have the aluminum nitrate completely dissolved and obtain the aluminum nitrate solution. In the molar ratio of P:Al (the phosphorus element contained in the phosphate ester to the aluminum element contained in the aluminum nitrate) is 1:1, the phosphate eater solution and the aluminum nitrate solution are mixed and stirred to react at 50° C. to obtain the homogeneous clear solution. Ammonia water is added into the homogeneous clear solution portion by portion, and the molar ratio of ammonia:Al is 1:1. The homogeneous clear solution is continuously stirred during the adding of the ammonia water to obtain the cathode active material coating liquid having a neutral pH value.

The cathode active material coating liquid and a cathode active material $LiNi_{1/3}Co_{1/3}Mn_{1/3}O_2$ in a mass ratio of 1:5 to 1:2 are mixed, the excess liquid phase filtered out, dried at 60° C., and then sintered at 400° C. in air to obtain the cathode composite material. A lithium ion battery is assembled by using the cathode composite material as the cathode active material, 1.0 mol $L^{-1}$ $LiPF_6$ (EC/EMC=3:7, m/m) as an electrolyte solution, and a lithium metal sheet as an anode. The lithium ion battery is charged and discharged.

Comparative Example 1

A lithium ion battery is assembled same as in Example 1 and cycled in same conditions as in Example 1 except that the cathode active material in the Comparative Example 1 is not coated.

Comparative Example 2

Figure 4:
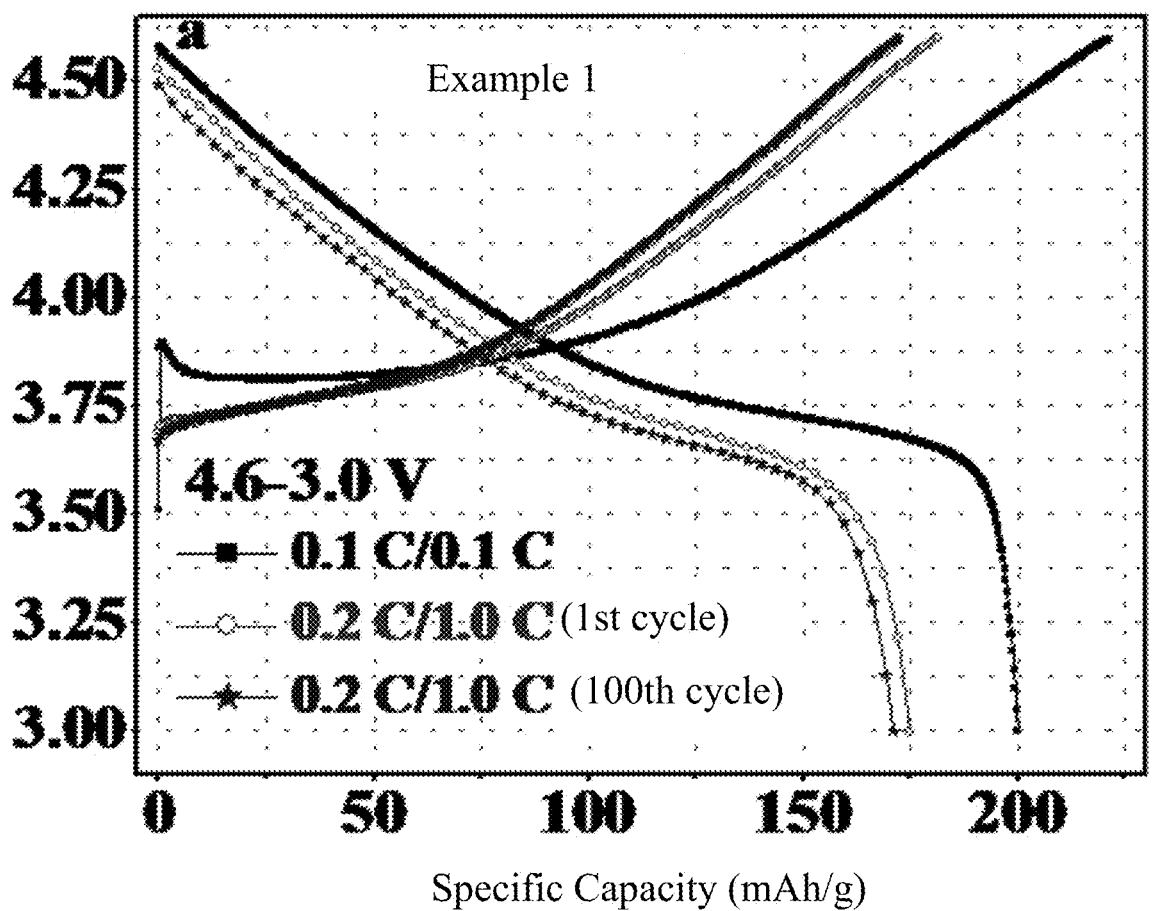
FIG. 4 shows charge-discharge voltage curves of one embodiment of a lithium ion battery using a coated cathode active material.

A cathode composite material is made by using the same method as in Example 1, except that the acidity of the clear solution is not adjusted. A lithium ion battery is assembled as in Example 1 and cycled in the same conditions as in Example 1, except that the cathode composite material of Comparative Example 2 is used as the cathode active material. Referring to FIG. 4, the lithium ion battery of Example 1 is galvanostatically charged and discharged between 4.6 V to 3.0 V at different current densities, that is the battery is charged at 0.1 C then discharged at 0.1 C, and charged at 0.2 C and then discharged at 1.0 C. It can be seen that the battery at the high discharge current density still has a high specific capacity, and has a relatively small capacity loss after 100 cycles showing a relatively good capacity retention.

Figure 5:
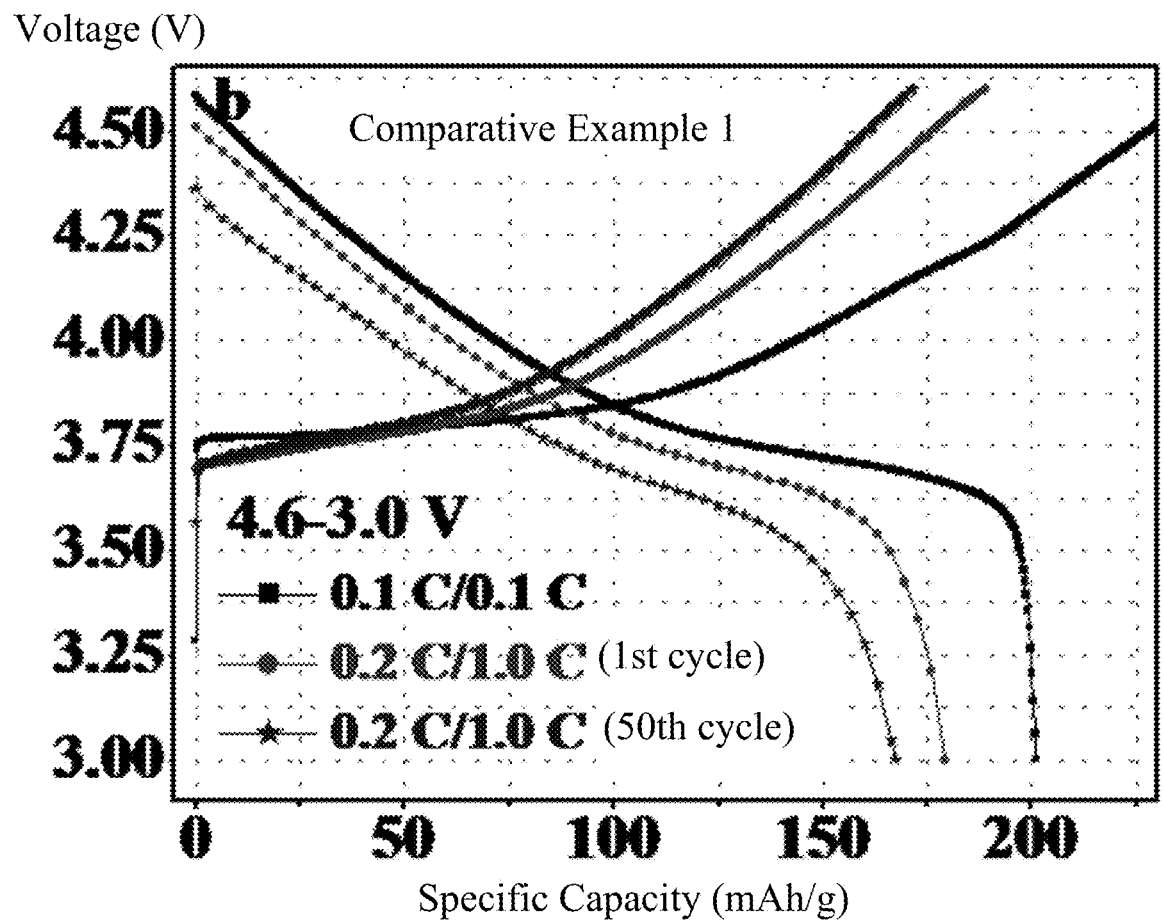
FIG. 5 shows charge-discharge voltage curves of the lithium ion battery using an uncoated cathode active material.
Figure 6:
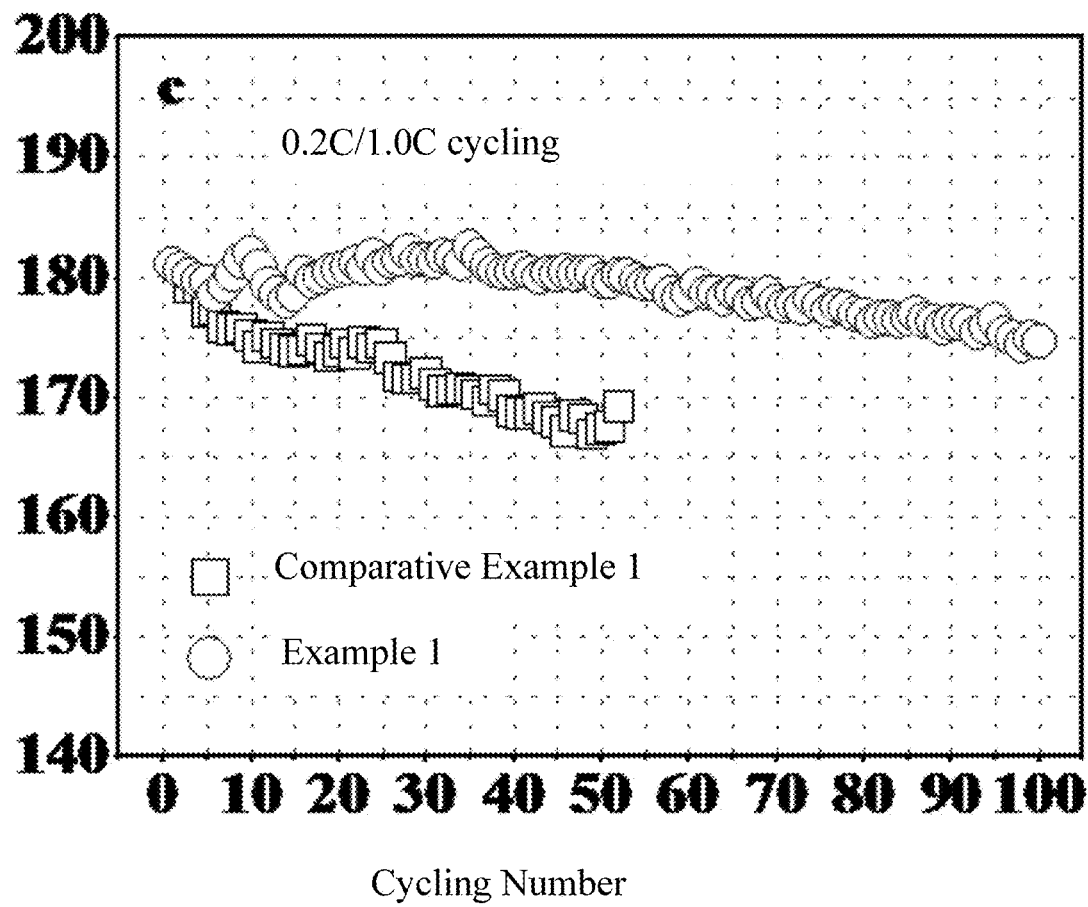
FIG. 6 shows a comparison between cycling performances of lithium ion batteries using the coated cathode active material and uncoated cathode active material.

Referring to FIG. 5 and FIG. 6, the lithium ion battery of Comparative Example 1 is cycled in the same conditions. It can be seen that the discharge specific capacity of the battery significantly decreases at the $50^{th}$ cycle at high discharge current density, showing a poor capacity retention of the battery. The results show that coating layer can significantly improve the capacity retention of the cathode active material, and can greatly enhance the electrochemical performance of the lithium ion battery.

Figure 7:
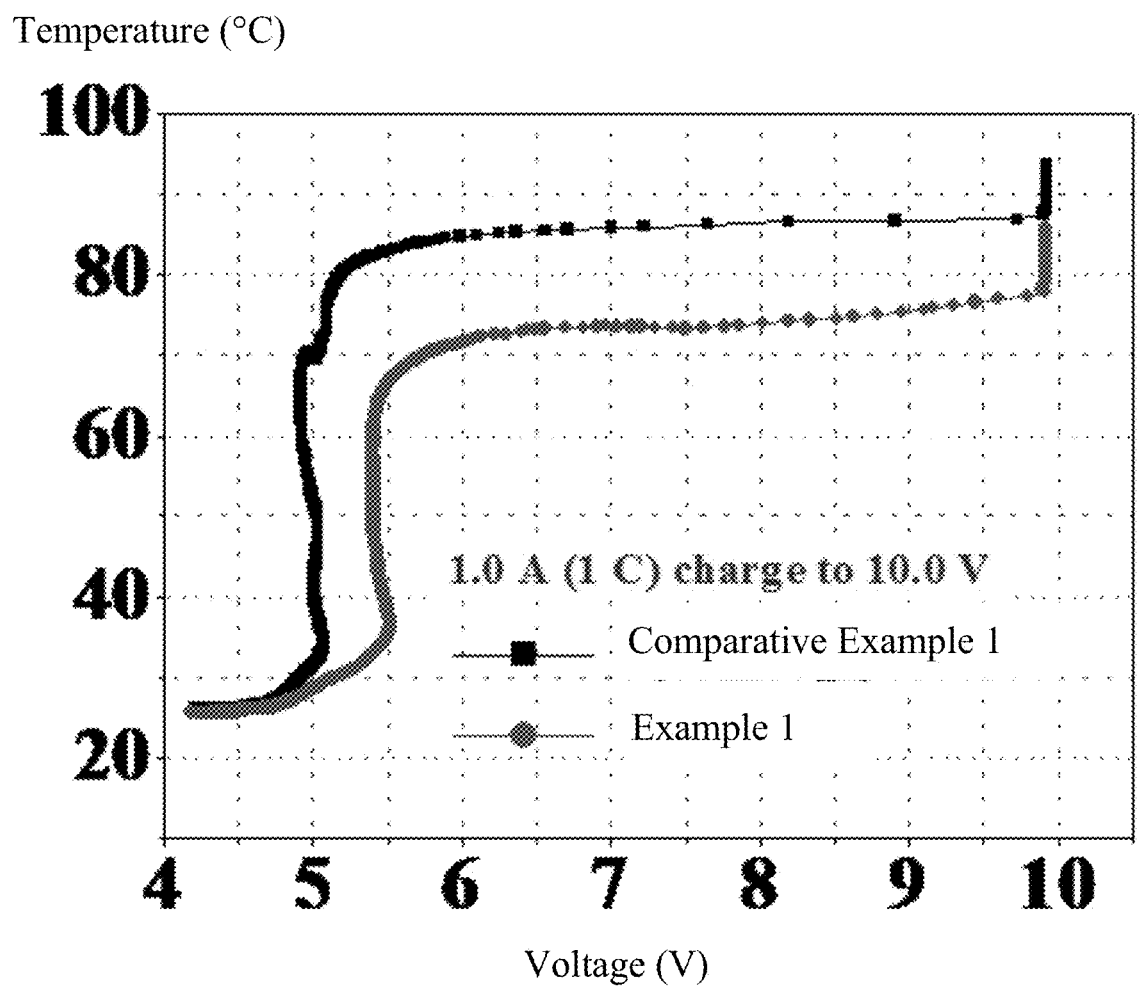
FIG. 7 shows a comparison between overcharge testing results of lithium ion batteries using the coated cathode active material coated and uncoated cathode active material.

Referring to FIG. 7, the lithium ion batteries of Example 1 and Comparative Example 1 are overcharged to 10.0 V by using a current of 1.0 A, and the temperature of the batteries during the overcharge process is measured. It can be seen that the temperature of the battery of Example 1 is significantly lower than the battery of Comparative Example 1.

Figure 8:
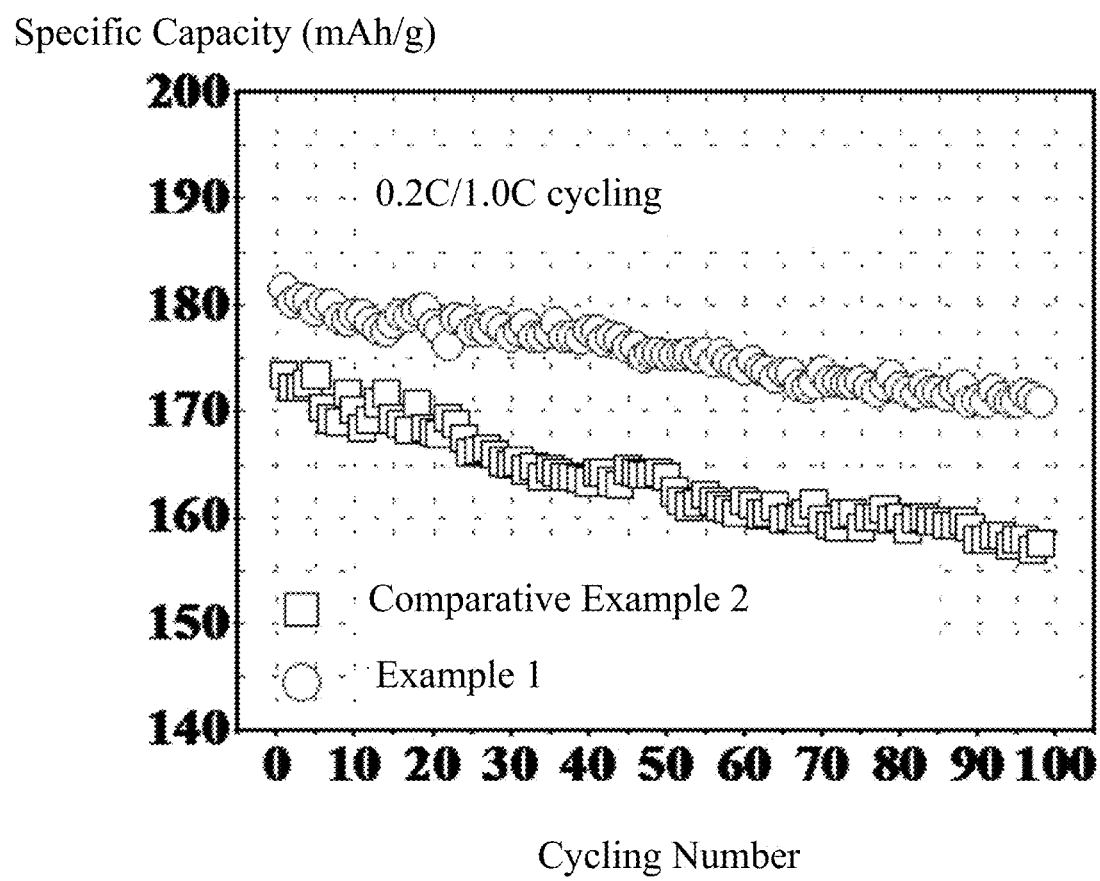
FIG. 8 shows a comparison between cycling performances of lithium ion batteries using the coating liquid having the acidity regulator and the coating liquid without the acidity regulator.

Referring to FIG. 8, the lithium ion batteries of Example 1 and Comparative Example 2 are galvanostatically charged at 0.2 C and discharged at 1.0 C between 4.6 V to 3.0 V. It can be seen that compared to the coating liquid in which the pH value is not adjusted, the coating liquid with a neutral pH value can significantly improve the capacity of the battery. In addition, the two batteries are both coated with the coating layer and both have relatively good capacity retention.

Depending on the embodiment, certain of the steps of methods described may be removed, others may be added, and the sequence of steps may be altered. It is also to be understood that the description and the claims drawn to a method may comprise some indication in reference to certain steps. However, the indication used is only to be viewed for identification purposes and not as a suggestion as to an order for the steps.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:
1. A method for making a cathode active material coating liquid comprising:
    forming a phosphate ester solution comprising a phosphate ester and an alcoholic solvent;

introducing an aluminum salt to the phosphate ester solution, the aluminum salt being soluble to the alcoholic solvent, and the aluminum salt reacting with the phosphate ester to form a homogeneous clear solution; and adding an acidity regulator to adjust a pH value of the homogenous clear solution to a range of 6 to 7 while maintaining the homogeneity and clarity of the solution.

2. The method of claim 1, wherein the alcoholic solvent is selected from the group consisting of methanol, ethanol, propanol, n-butanol, isopropanol, and combinations thereof.

3. The method of claim 1, wherein the phosphate ester is selected from the group consisting of monomethyl phosphate, dimethyl phosphate, trimethyl phosphate, monoethyl phosphate, diethyl phosphate, triethyl phosphate, monobutyl phosphate, dibutyl phosphate, tributyl phosphate, monoisopropyl phosphate, diisopropyl phosphate, triisopropyl phosphate, and combinations thereof.

4. The method of claim 1, wherein the aluminum salt is selected from the group consisting of aluminum chloride, aluminum nitrate, aluminum isopropoxide, aluminum lactate, and combinations thereof.

5. The method of claim 1, wherein a molar ratio of phosphorus element in the phosphate ester to aluminum element in the aluminum salt is about 1:1.

6. The method of claim 1, wherein the introducing of the aluminum salt to the phosphate ester solution and reacting the aluminum salt with the phosphate ester to form the homogeneous clear solution comprises:

adding the aluminum salt to another alcoholic solvent and stirring till the aluminum salt is dissolved to obtain an aluminum salt solution; and further mixing the phosphate ester solution and the aluminum salt solution to cause the aluminum salt to react with the phosphate ester to form the homogeneous clear solution.

7. The method of claim 1, wherein the acidity regulator is selected from the group consisting of ammonia water, ammonium bicarbonate, ammonium carbonate, ammonium acetate, pyridine, triethylamine, and combinations thereof.

8. The method of claim 7, wherein a molar ratio of nitrogen element in the acidity regulator to aluminum element in the aluminum salt is in a range from about 1:1 to about 6:1.

9. The method of claim 1, wherein the forming the phosphate ester solution further comprising:

adding at least one of phosphoric acid and phosphorus pentoxide in the alcoholic solvent to react with the alcoholic solvent.

10. A method for coating a cathode active material comprising:

forming a phosphate ester solution comprising a phosphate ester and an alcoholic solvent;

introducing an aluminum salt to the phosphate ester solution, the aluminum salt being soluble to the alcoholic solvent, and the aluminum salt reacting with the phosphate ester to form a homogeneous clear solution; and adding an acidity regulator to adjust a pH value of the homogenous clear solution to a range of 6 to 7 to achieve a coating liquid;

uniformly mixing the cathode active material with the coating liquid to obtain a solid-liquid mixture; and drying and sintering the solid-liquid mixture to obtain a cathode composite material, the cathode composite material comprising the cathode active material and a coating layer coated on a surface of the cathode active material.

11. The method of claim 10, wherein the solid-liquid mixture is a slurry.

12. The method of claim 10, wherein the solid-liquid mixture is sintered at a temperature of about 300° C. to about 800° C.

13. A method for making a cathode active material coating liquid comprising:

adding phosphoric acid in an alcoholic solvent to form a phosphate ester solution comprising a phosphate ester;

introducing an aluminum salt to the phosphate ester solution, the aluminum salt being soluble to the alcoholic solvent, and the aluminum salt reacting with the phosphate ester to form a homogeneous clear solution; and adding an acidity regulator to adjust a pH value of the homogenous clear solution to a range of 6 to 7 while maintaining the homogeneity and clarity of the solution.

* * * * *